FF1 Condition I — AL1 grounded — AL4 locks FF2 in Condition I
FF1 Condition II — AL1 negitive — AL4 unlocks
FF2 Condition I — AL2 grounded
FF2 Condition II — AL2 negitive
FF3 Condition I — AL3 negitive
FF3 Condition II — AL3 grounded March 18, 1958 — J. P. CONNER ET AL — 2,827,545
CONTROL APPARATUS
Filed May 27, 1955 — 4 Sheets-Sheet 4

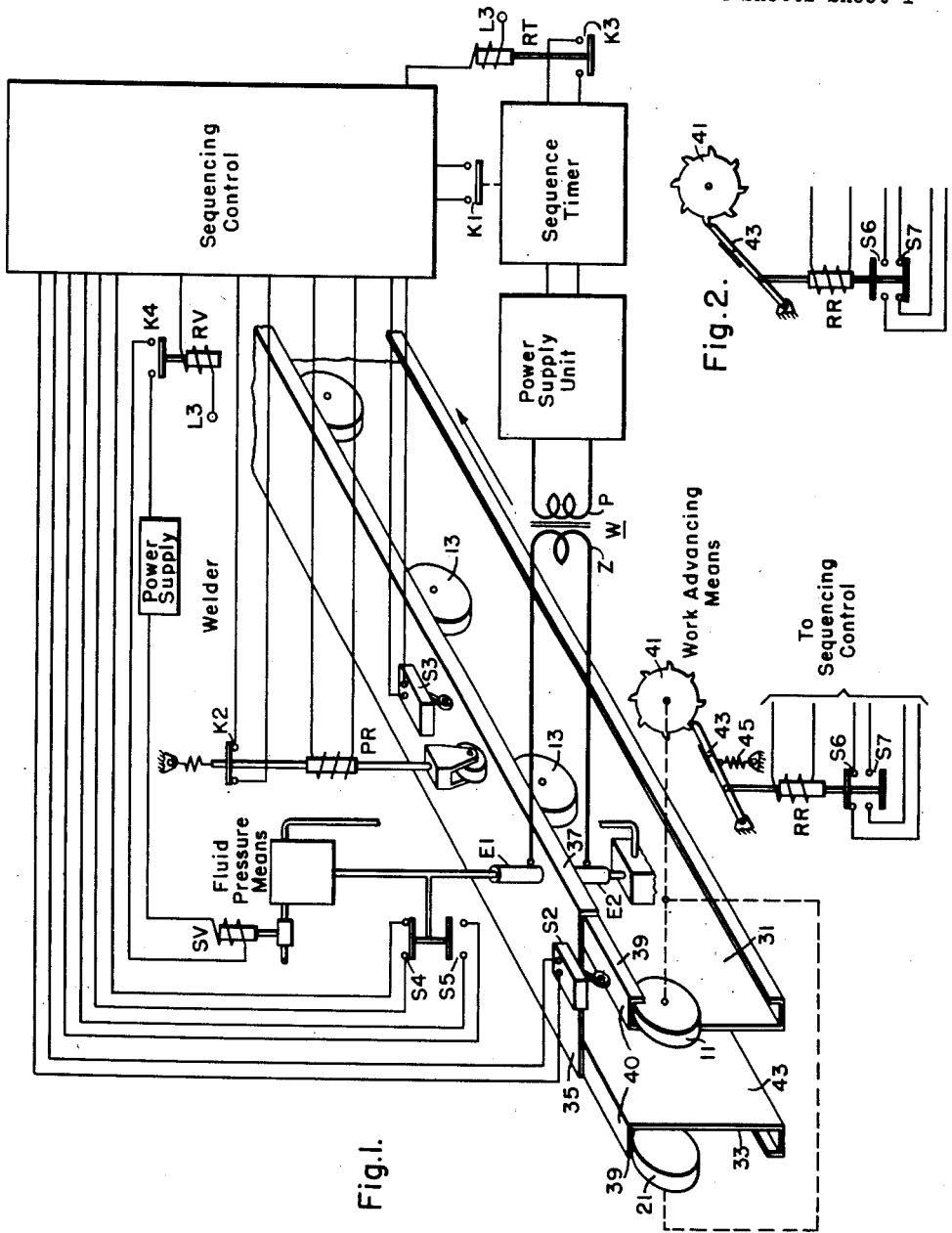

United States Patent Office 2,827,545
Patented Mar. 18, 1958

2,827,545
CONTROL APPARATUS

John P. Conner, Brighton Township, Beaver County, and Richard L. Bright, Adamsburg, Pa., assignors to Westinghouse Electric Corporation, East Pittsburgh, Pa., a corporation of Pennsylvania Application May 27, 1955, Serial No. 511,503

8 Claims. (Cl. 219—108)

This invention relates to control apparatus and has particular relation to apparatus for producing automatically a sequence of operations particularly adaptable to industrial automation. While in its broader aspects this invention is applicable to automation of any general type, this invention in its specific aspects concerns itself with the control of a welder for joining work with a series of welds and in this application the invention will be described with reference to a welder for bus duct in a control for which the invention has actually been embodied.

Bus duct is made up of a pair of side plates which are joined by top and bottom plates into a rectangular duct or tube. At least the top plate is joined to the side plates by resistance welding. For this purpose, an assembly consisting of the top plate and the adjacent side plates is passed between welding electrodes, and welded spots are produced at intervals. In producing the joint, the first step is to convey the assembly to a position between welding electrodes on a conveyor. The assembly is held on this conveyor by one or more pressure rollers. Thereafter a sequence timer is actuated to cause the electrodes to engage the top and side plates and to produce a weld. After the weld is produced, the electrodes are disengaged from the work and then the plate is advanced and the above-described process is repeated.

In producing the joints, it is necessary not only that the welds be of proper quality but also that the transmission of current between the welding electrodes at improper times be positively avoided. This necessarily requires a highly precise and reliable sequencing control unit. Apparatus in accordance with the teachings of the prior art is available for this purpose and has been found to operate reasonably satisfactorily, but it is highly complex and costly including a large number of mechanical relays.

It is, accordingly, broadly an object of this invention to provide a highly precise and reliable control of simple structure for properly sequencing the operations of welding apparatus designed to produce a joint in an elongated object such as our duct by making a number of spaced welds along the object.

In accordance with this invention, a transistor control for sequencing the operation of welding or other apparatus of the above-described type is provided and a specific object of this invention is to provide a novel transistor circuit particularly suitable for use in the control of the sequencing of such apparatus.

The control in accordance with the invention includes a plurality of transistor flip-flop networks, which are so interconnected with the components of the welding apparatus as to produce the desired sequence of operations and to prevent maloperation. The flip-flop networks are interconnected with the components of the welding apparatus through what are called "decision networks." These decision networks include so-called Not components, And components and Or components. In the apparatus in accordance with this invention, a Not component is connected to prevent operation of the apparatus, unless the parts to be welded, which will here be called the work, are properly seated in the conveyor; the And components are connected to assure that welding current flows only during times when all of the conditions necessary for a weld to be produced are met, that is, when the work is at rest and the electrodes are firmly engaged with the work, the And components are also connected to prevent movement of the work unless it is properly seated in the conveyor and is disengaged from the electrodes. An Or component is interconnected with the And components to permit either automatic or manual operation of the apparatus under the proper circumstances.

The novel features considered characteristic of the invention are disclosed generally above. The invention itself, both as to its organization and its method of operation, together with additional objects and advantages thereof, will be understood from the following description of a specific embodiment taken in connection with the accompanying drawings, in which:

Figure 1 is a diagrammatic view showing a welder in accordance with this invention;

Fig. 2 is a diagrammatic view showing the work advancing mechanism of the welder in its position just after it has advanced to work;

Description

Figure 3:
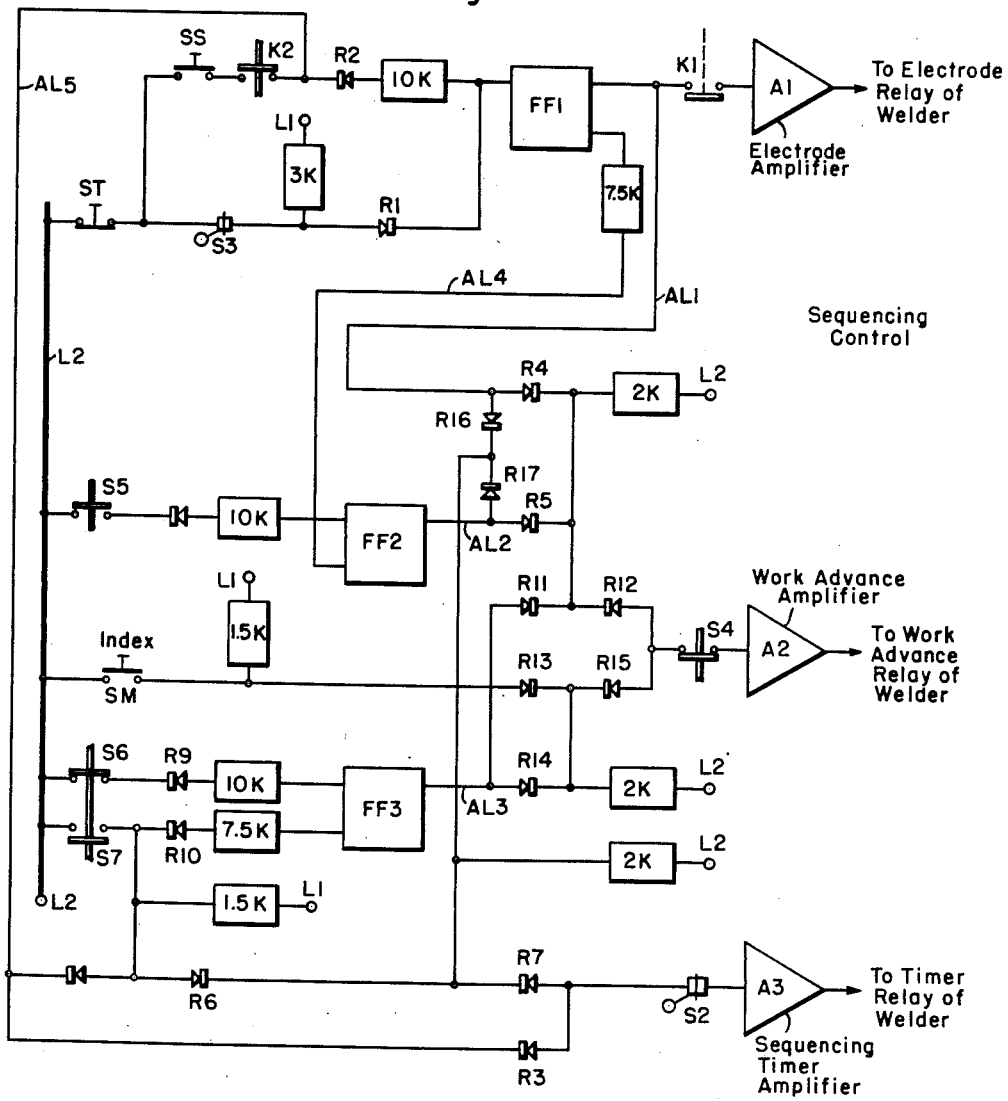
Fig. 3 is a diagram showing the general organization of the control circuit in accordance with this invention.

In Fig. 1 a complete system for welding bus duct is shown. This system includes a Welder, a Sequencing Control, a Power Supply Unit and a Sequence Timer.

The Welder includes a conveyor made up of a pair of arrays of spaced rollers 11 and 13 and 21, at least one roller 11 and 21 of each pair being driven by work advancing means. The parts of the bus duct to be joined include side walls 31 and 33, each of channel cross-section, and a top 35 of C cross-section. The top 35 is suspended across the side walls 31 and 33 with its flanges 37 engaging the cooperative edges 39 extending from the flanges 40 of the side walls 31 and 33. The top 35 is welded along its edges to the flanges 40 of the side walls by which it is engaged. For this purpose, the top and the side walls are combined into a unitary structure and transmitted by the roller conveyor 11—13—21 through the Welder. In being assembled, the top is disposed on the side walls 31 and 33 so that a portion 43 of the side walls extends beyond the top 35 in the direction opposite to the direction of movement represented by an arrow of the unit through the Welder.

The Welder may include separate electrode units for welding the top 35 to each of the side walls 31 and 33, but for purposes of clarity, only one welding unit is shown. This unit includes a pair of welding electrodes E1 and E2 between which the secondary Z of a welding transformer of a resistance welder is connected. The primary P of the secondary transformer W is connected to be supplied from the Power Supply Unit which is, in turn, controlled from a Sequence Timer. The Sequence Timer and the Power Supply Unit may be of any type known in the art. Specifically, they may be of the type disclosed in an application Serial No. 424,094, filed April 19, 1954, to Hubert W. Van Ness, entitled "Electric Discharge Apparatus," or in an application Serial No.

490,872, filed February 28, 1955, to Hubert W. Van Ness and William E. Large, for "High Speed Resistance Welding Apparatus."

The Sequence Timer usually times squeeze, weld, hold, and off intervals of a welding operation and may be set for so-called non-beat operation; that is, for operation such that when a starting switch of the Sequence Timer is momentarily closed, the timer passes through a single sequence. Such a starting switch is the contact K3 which is actuable by the timer relay of the Sequencing Control.

The electrodes E1 and E2 are disposed so as to engage the regions to be welded of the top and side walls 35 and 31 as the work passes through the roller conveyor 11—13—21. The electrodes E1 and E2 are urged into engagement with the work and disengaged from the work by fluid pressure means. This means is controlled by a solenoid SV supplied through a contact K4 of a relay RV in the Sequencing Control, when a contact K1 of a relay in the Sequence Timer is closed at the beginning of the squeeze interval of the Sequence Timer. The fluid pressure means is so connected to both electrodes E1 and E2 that they are both disengaged from the work during the interval between welds when the work is to be advanced through the conveyor.

The Welder also includes a plurality of switches S2, S3, S4 and S5. The switch S2 is disposed on the side of the welding electrodes E1 and E2 in the direction from which the work passes through the conveyor, and the switch S3 is disposed on the other side of the welding electrodes. The switches S2 and S3 are closed when the work is in the conveyor, switch S2 being closed by a single thickness of the work, and switch S3 by two thicknesses of the work. Switches S4 and S5 are actuable in dependence upon the position of the electrodes E1 and E2, switch S4 being closed when the electrodes E1 and E2 are disengaged from the work and switch S5 being closed only so long as the electrodes are in engagement with the work.

For advancing the work, a ratchet mechanism is provided. This mechanism includes a ratchet wheel 41 actuable by a pawl 43. The wheel 41 is in driving engagement with the rollers 11 and 21 which drive the work. The pawl 43 is actuable by solenoid RR of the Sequencing Control. When the solenoid RR is energized, it causes the pawl 43 to rotate the wheel 41 to advance the work. When the solenoid RR is deenergized, the pawl is retracted to its original position by a spring 45.

Switches S6 and S7 are associated with the ratchet mechanism. Switch S6 is closed with the pawl 43 retracted; that is, when it is in a position ready to advance the ratchet wheel 41. Switch S7 is closed with the pawl 43 in the position in which it is just after it has completed an advancing operation.

The work is held in engagement with the conveyor and in condition to be welded by a pressure roller PR which may be solenoid actuated and which includes a contact K2 closed when the work is held in position to be welded by the roller.

The Sequencing Control is supplied from conductors L1, L2, L3 and LG. The conductors L1 and L2 supply direct current voltage which in the practice of this invention is of the order of 20 volts, but naturally may be an entirely different voltage. Conductor LG is at a potential intermediate the potentials of conductors L1 and L2 and may be grounded to the chassis or container of the apparatus. In the following discussion, conductor LG will be referred to as ground. In the practice of this invention conductor L1 is at a potential of +10 volts with reference to the potential of conductor LG and conductor L2 is of the potential of −10 volts with reference to the potential of conductor LG. Conductor L3 is connected to the negative terminal of a 24-volt supply in the practice of this invention. This voltage is adequate to actuate the relays RV and solenoid RR.

The Sequencing Control includes a plurality of transistor flip-flop circuits FF1, FF2 and FF3, and a plurality of amplifier units A1, A2 and A3. The flip-flop networks FF1, FF2 and FF3 each has two conditions, herein called condition I and condition II, and they are each of the bistable type, that is, remain in one of the conditions until positively actuated to the other. The flip-flop networks may also be locked in any condition in which they happen to be by maintaining the emitter of the non-conducting transistor negative relative to the base, and when so locked do not respond to a signal to pass from one condition to the other. The unlocking of a flip-flop network by making the emitter of the non-conducting transistor electrically positive relative to the base does not cause it to pass from the condition in which it happens to be to the other. The conducting transistor must, in addition, receive a signal making the collector negative with reference to the base to cause the flip-flop network to pass from one condition to the other. The flip-flop networks are controlled through decision networks and, in turn, control the operation of the amplifier units A1, A2 and A3 through decision networks. The amplifier unit A1 controls the relay RV which actuates the fluid pressure solenoid SV; the amplifier unit A2 controls the solenoid RR which actuates the pawl 43; and the amplifier unit A3 controls a relay containing contact K3 which starts the operation of the Sequence Timer.

The flip-flop network FF1 includes a pair of transistors T1 and T2. Each of these transistors is preferably of the PNP type and has a collector electrode 51, an emitter electrode 53 and a base electrode 55. Both emitter electrodes 53 are grounded. The collector electrodes 51 are connected each through a collector resistor 57 and 67 of substantially the same magnitude to the conductor L2. The collector electrode 51 of the transistor T1 is also connected to the base electrode 55 of transistor T2 through a resistor 69 which may be called an inter-electrode resistor, and the collector electrode 51 of the transistor T2 is similarly connected to the base 55 of transistor T1 through another resistor 79 of the same magnitude as the former. The base electrodes 55 of both transistors T1 and T2 are connected through high resistors 81 and 91 of substantially the same magnitude to the conductor L1. The latter resistors 81 and 91 may be called base resistors and are of the order of 10 times the resistance of the inter-electrode resistors 69 and 79 and of the order of 50 times the resistance of the collector resistors 57 and 67.

The flip-flop network FF1 may be regarded as having an input terminal I-1 at the base 55 of the transistor T1 and an output terminal O1 at the collector 51 of transistor T2 and an output terminal O2 at collector 51 of transistor T1. This input terminal I-1 is connected to the conductor L1 through a resistor 93 through a rectifier R1. The junction J1 of the resistor 93 and the rectifier R1 is adapted to be connected to the conductor L2 through a stop switch ST for stopping the operation of the Sequencing Control and the switch S3.

The input terminal I-1 of the flip-flop network FF1 is also adapted to be connected to the conductor L2 through the switch ST, a start switch SS, the contact K2, a rectifier R2, and a resistor 95. The rectifier R2 is poled to permit conduction from conductor L2 to conductor L1, and thus to permit a potential to be impressed on the base of transistor T1 which is negative relative to the potential of the collector 51. Under the proper circumstances, such a negative potential would permit transistor T1 to conduct.

Output terminal O1 is connected to a conductor AL1 and terminal O2 is connected to a conductor AL4 through a resistor 95.

Figure 4:
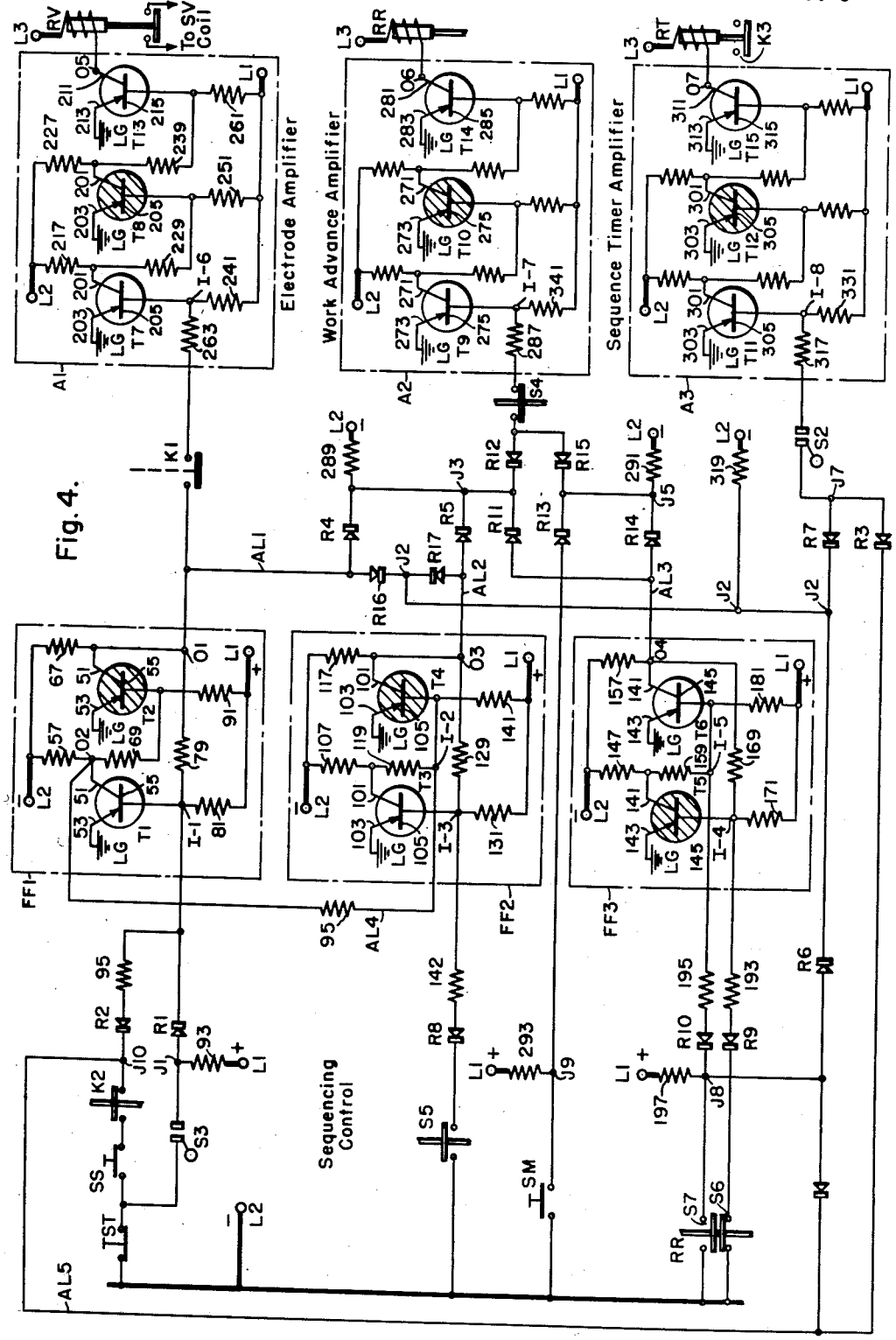
Fig. 4 is a circuit diagram of a preferred embodiment of this invention.
Figure 5:
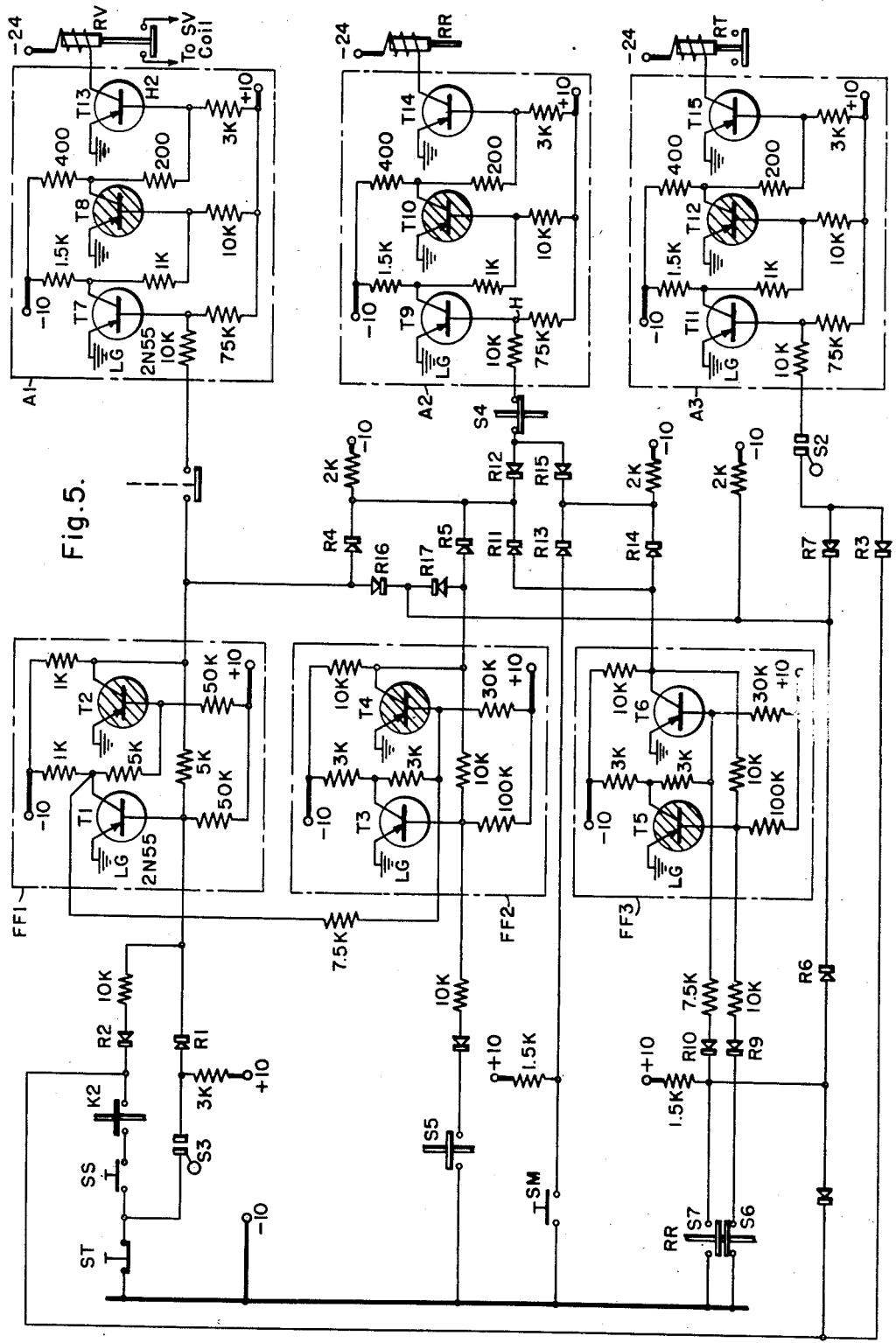
Fig. 5 is a circuit diagram similar to that shown in Fig. 4, but with the component magnitudes indicated. This figure is being presented with the thought of aiding those skilled in the art to practice the invention and should not, in any way, be regarded as limiting the scope of this invention.

As shown in Fig. 4 with switches SS, K2 and S3 open the flip-electrode network FF1 is in a condition in which the base electrode 55 of transistor T2 is at a substantial negative potential with respect to its emitter electrode 53 and the base electrode 55 of transistor T1 is at a substantial positive potential with respect to its emitter electrode 53. Under such circumstances, transistor T2 is conducting, and transistor T1 is non-conducting. This may be regarded as condition I of flip-flop network FF1. Condition II is the condition of the network in which transistor T1 is conducting and transistor T2 is non-conducting. When the flip-flop network FF1 is in condition I, the collector electrode 51 of transistor T2 and output terminal O1 may be regarded as grounded, and the collector electrode 51 of transistor T1 and output terminal O2 may be regarded as being at a substantial negative potential with reference to ground. When the switches S3 and ST are closed, the potential at the junction J1 is substantially reduced and conduction through the rectifier R1 is blocked. This has the effect of permitting the potential of the base electrode 55 of transistor T1 to be changed from voltage of conductor L1 positive relative to the emitter 53 to a voltage nearer L2 which is negative relative to the emitter 53 but not relative to the collector 51 and thus to unlock the flip-flop network FF1.

Flip-flop network FF2 includes a transistor T3 and a transistor T4. Transistor T3 and transistor T4 each includes a collector electrode 101, an emitter electrode 103 and a base electrode 105. The emitter electrodes 103 are grounded. The collector electrode 101 of transistor T3 is connected through a collector resistor 107 to conductor L2. The collector electrode 101 of transistor T4 is similarly connected through a collector resistor 117 to conductor L2. The collector electrode 101 of transistor T3 is connected to the base electrode 105 of transistor T4 through an inter-electrode resistor 119; the collector electrode of transistor T4 is connected to the base electrode of transistor T3 through an interelectrode resistor 129. The base electrodes 105 of each of the transistors T3 and T4 are connected through base resistors 131 and 141 to conductor L1.

Flip-flop network FF2 may be regarded as having two input terminals, one I-2 at the base 105 of transistor T4 and the other I-3 at the base of transistor T3. Network FF2 has an output terminal O3 at the collector 101 of transistor T4. Flip-flop network FF2 is also in what may be called condition I with transistor T4 conducting and transistor T3 non-conducting.

Terminal I-2 is connected to conductor AL4. By means of this connection, the flip-flop network FF1 is able to lock the flip-flop network FF2 into condition I. Terminal I-3 is adapted to be connected to conductor L2 through switch S5, rectifier R8, and a resistor 142. When switch S5 is closed, flip-flop network FF2 may be made to pass from condition I to condition II if it is unlocked by flip-flop network FF1. This transition is produced by the impressing of the negative potential through rectifier R8 on the base of transistor T3.

Flip-flop network FF3 includes transistors T5 and T6, each of which has a collector electrode 141, an emitter electrode 143 and a base electrode 145. These electrodes are connected into the network FF3 through resistors 147, 157, 159, 169, 171, 181 in the same way as the transistors T3 and T4 are connected in network FF2. Flip-flop network FF3 has input terminals I-4 and I-5 at the bases 145 of transistors T5 and T6 and an output terminal O4 at the collector 141 of transistor T6. Input terminal I-4 is connected to conductor L2 through switch S6, rectifier R9, and a resistor 193. This switch S6 is closed with the pawl 43 of the work advancing mechanism in the retracted position, and thus a negative potential is normally impressed on the base 145 of transistor T5 so that it is conducting. The flip-flop network FF3 may then be regarded as in its condition I with transistor T5 conducting. When switch S6 is opened, transistor FF3 is unlocked and thus is conditioned to flop to condition II. Input terminal I-5 is connected to conductor L1 through a resistor 195 and rectifier R10 and resistor 197. The junction JB of resistor 197 and rectifier R10 is adapted to be connected to the conductor L2 through switch S7. The closing of the switch S7 causes the flip-flop network FF3 to pass from condition I to condition II. Output terminal O4 is connected to conductor AL3.

Amplifier A1 includes transistors T7 and T8 and an output transistor T13 in cascade. Each of the transistors has a collector electrode 201 and 211, an emitter electrode 203 and 213, and a base electrode 205 and 215. The emitter electrodes 203 and 213 are grounded. The collector electrodes 201 of transistors T7 and T8 are connected to conductor L2 through collector resistors 217 and 227. The collector electrode 201 of transistor T7 is connected to the base 205 of transistor T8 through a coupling resistor 229, and the collector electrode 201 of transistor T8 is connected to the base 215 of transistor T13 through another coupling resistor 239. The bases of transistors T7, T8, and T13 are connected to the conductor L1 through resistors 241, 251, 261.

The amplifier A1 has an input terminal I-6 at the base 205 of transistor T7 which is adapted to be connected through the contact K1 and through a resistor 263 to the output terminal O1. The amplifier A1 has an output terminal O5 at the collector 211 of transistor T13 which is connected to the conductor L3 through the exciting coil of relay RV.

With the contact K1 open, the base 205 of transistor T7 is at a substantial positive potential relative to its emitter electrode 203, and this transistor is non-conducting. The base 205 of transistor T8 is then at a substantial negative potential relative to its emitter electrode 203 and this transistor is conducting. The base 215 of transistor T13 is then grounded through resistor 239 and is at a substantial positive potential, with respect to its emitter electrode 213, and the latter is non-conducting.

The amplifier A2 is similar to the amplifier A1 including transistors T9 and T10, and an output transistor T14. Each of the transistors T9, T10 and T4 has a collector electrode 271 and 281, an emitter electrode 273 and 283, and a base electrode 275 and 285, and the electrodes are connected in a cascade circuit similar to the circuit of amplifier A1. The amplifier A2 has an input terminal I-7 at the base 275 of transistor T9 and an output terminal O6 at the collector 281 of transistor T14.

The input I-7 of amplifier A2 is connected through a resistor 287, the switch S4, and a pair of And networks, respectively, to the conductors AL1, AL2 and AL3, respectively. One And network consists of the rectifiers R4, R5, R11 and R12 and resistor 289. The cathodes of the rectifiers R4, R5, R11, R12 are connected to a junction J3 and the anodes respectively to conductors AL1, AL2, AL3 and switch S4; the resistor 289 connects junction J3 to the conductor L2. The other And network consists of the rectifiers R13, R14, and R15 and the resistors 291 and 293. The cathodes of the rectifiers R13, R14, R15 are connected to junction J5; the anodes connected, respectively to junction J9, conductor AL3 and switch S4. Junction J9 is connected to conductor L1 through resistor 293 and is adapted to be connected to conductor L2 through the indexing switch SM. Junction J5 is connected through resistor 291 to conductor L2. Rectifiers R12 and R15 constitute an Or network for junctions J3 and J5 since conduction may take place to either through switch S4 when either junction J3 or J5 is negative. Thus, operation may be produced by the indexing switch SM even if the automatic portion of the Control is quiescent.

When either flip-flop FF1 or FF2 is in condition I or flip-flop FF3 is in condition II, the corresponding conductor AL1, AL2 or AL3 is at ground potential and rectifier R12 can then conduct to ground. When this conduction takes place, the base 275 of transistor T9 is positive relative to its emitter 273 and transistor T9 is non-conducting, so that the base 275 of transistor T10 is negative relative to its emitter 273. Transistor T10 is then conducting and base 285 of transistor T14 is grounded, so that transistor T14 is non-conducting. The output terminal O6 is connected through the exciting coil of solenoid RR to conductor L3, and the solenoid is energized when transistor T14 conducts.

The amplifier A3 is similar to the amplifiers A1 and A2 including transistors T11 and T12 and output transistor T15. These transistors each have a collector electrod 301 and 311, an emitter electrode 303 and 313, and a base electrode 305 and 315 and are connected in a cascade circuit similar to the circuit of the other resistors. The amplifier A3 has an input I-8 at the base 305 of transistor T11 which is connected through an input resistor 317, the switch S2, and an And network to the flip-flops FF1 and FF2 and to the junction J8. This And network includes the rectifiers R16, R17, R6, and R7 and a resistor 319. The cathodes of the rectifiers R16, R17, R6 and R7 are connected together to junction J2. This junction J2 is connected through the resistor 319 to conductor L2. The anodes of rectifiers R7, R16, R17 and R6 are connected respectively to switch S2, conductor AL1, conductor AL2 and junction J8. The input I-8 is also adapted to be connected through switch S2, rectifier R3 and conductor AL5 to junction J10 which is adapted to be connected to conductor L2 through switches K2, SS and ST. Rectifiers R7 and R3 constitute an Or network permitting the Control to start by momentary closing of the switch SS and to continue by the control of the potential of junction J2.

Terminal O7 is connected to conductor L3 through the coil of relay RT. It is seen that if flip-flop FF1 or flip-flop FF2 is in condition I or switch S7 is open, junction J2 is at slightly positive or ground potential. Under the circumstances, rectifier R7 is conducting, and even if switch S2 is closed the base 305 of transistor T11 is substantially positive relative to its emitter 303. Transistor T11 is then non-conducting, transistor T12 being, accordingly, conducting and transistor T15 being non-conducting.

*Stand-by*

In the stand-by condition of the apparatus, power is supplied to the conductors L1, L2, L3 and to the Power Supply Unit, the Sequence Timer and the Sequencing Control so that all of these units are in readiness for operation. Before the work passes through conveyor, switches S2 and S3 are open, contact K2 is open, and switch SS is open. Since switch S2 is open, amplifier A3 is in the condition shown in Fig. 4 with transistor T15 non-conducting and timer relay RT deenergized. Contact K3 is then open and the Sequence Timer is in unactuated condition, so that contact K1 is open. With contact K1 open, amplifier A1 is in the condition shown in Fig. 4 with transistor T13 non-conducting. Relay RV is then deenergized, and the work advancing pawl 43 is in the retracted position. Switch S4 is then closed, and switch S5 is open. With contacts K2, switch SS and switch S3 open, flip-flop FF1 is in condition I, so that the junctions J2 and J3t are grounded. Amplifier A2 is then in the condition shown in Fig. 4 with transistor T14 non-conducting and solenoid RR deenergized. The ratchet mechanism is then in the retracted position with switch S6 closed and switch S7 open.

Since switch S3 is open, flip-flop FF1 is locked in condition I. Since switch S5 is open, flip-flop FF2 is in condition I, and it is locked in this condition by flip-flop FF1. Since switch S6 is closed and switch S7 is open, flip-flop FF3 is in condition I and is locked in this condition.

*Operation*

To set the apparatus for an operation, the work with the top and side walls 31, 33 and 35 assembled in condition to be welded is placed on the conveyor and positioned for the first weld.

When the work is positioned switches S2 and S3 are closed and as the work is placed under the roller PR, contact K2 is closed. Now the welding may be started by the momentary actuation of the switch SS. This has the effect of impressing through the rectifier R2 a negative potential relative to the collector 51 on the base of transistor T1. Transistor T1 then conducts grounding the base 55 of transistor T2 through the inter-electrode resistor 69 of transistor T1. This grounding has the effect of rendering the base 55 electrically positive relative to the emitter 53, and transistor T2 becomes non-conducting. Flip-flop FF1 has now flopped from condition I to condition II.

In addition, the closing of switch SS causes conductor AL5 to assume the potential of conductor L2, causing junction J7 to become substantially negative through rectifier R3. Since at this time switch S2 is closed, conduction takes place from conductor L1 to junction J7 through the base resistor 331 of transistor T11 and input resistor 317 of amplifier A3 and the base 305 of transistor T11 becomes substantially negative, so that transistor T11 becomes conducting. Transistor T12 then becomes non-conducting, and the transistor T15 becomes conducting, so that relay RT is actuated closing contact K3 and starting the timing of the Sequence Timer. At the end of the squeeze interval of the Sequence Timer, contact K1 is closed.

Since switch SS is only closed momentarily, the actuation of the amplifier A3 takes place only momentarily, but once contact K3 is closed, it starts the timing out of the Sequence Timer and since the Sequence Timer is of the non-beat type, the timing out continues regardless of the position of contact K3.

At this time with contact K1 closed, flip-flop FF1 is in condition II. A negative potential is then impressed on the base 205 of transistor T7 through the input resistor 263 of amplifier A1. Transistor T7 then conducts, transistor T8 becomes non-conducting, and transistor T13 conducts to actuate relay RV. The solenoid SV is then actuated, and the electrodes E1 and E2 are brought into engagement with the work under pressure.

The Sequence Timer now continues to time and during the weld interval, welding current flows through electrodes E1 and E2 to produce the first welded spot in the work. After timing out the weld interval, the Sequence Timer continues to time during the hold interval, and during this time, contact K1 is closed and the electrodes are engaged with the work. At the end of the hold interval, contact K1 is opened, relay RV is deenergized, and the electrodes E1 and E2 are disengaged from the work. The Sequence Timer now continues to time out the off time.

Now consider what happens to the remainder of the system while the Sequence Timer is timing out. At the beginning of the squeeze interval when the movement of the work starts, the switch S4 is opened but this has no effect on the amplifier A2, since it is still in its initial condition. Near the end of the squeeze time when the electrodes E1 and E2 are firmly engaged with the work, switch S5 is closed. The passing of flip-flop FF1 from condition I to condition II, conditioned flip-flop FF2 to be flopped from condition I to condition II, and the closing of switch S5 causes FF2 to flop from condition I to condition II. Junction J3 now becomes highly negative, but this has no effect on amplifier A2 since switch S4 is, at this time, open.

When at the end of the hold interval, the electrodes E1 and E2 are retracted from the work, switch S5 opens and switch S4 closes. The opening of switch S5 has no effect on flip-flop FF2 since the latter is now locked in its condition II because flip-flop FF1 is in condition II. Junction J3 then remains negative and when switch S4 is closed, current flows from conductor L1 to junction J3 through the base resistor 341 of transistor T9 and the input resistor 287 of amplifier A2, and the base 275 of transistor T9 becomes negative relative to the emitter 273, so that transistor T9 becomes conducting, transistor T10 non-conducting and transistor T14 conducting. The solenoid RR is now actuated and the work is advanced. When the pawl 43 is thus actuated, switch S6 is opened conditioning flip-flop FF3 to pass from condition I to condition II, and when switch S7 is closed, flip-flop FF3 passes to condition II. In addition, the closing of switch S7 causes junction J8 to become electrically negative and since, at this time, switch S2 is still closed, amplifier A3 is again actuated closing contact K3 and starting another timing operation of the Sequence Timer.

In addition, because flip-flop FF3 is in condition II, junction J5 is now grounded to the emitter 143 of transistor T6, and amplifier A2 is reverted to its initial condition, so that relay RR is deenergized and the pawl 43 of the work advancing mechanism is reverted to its initial condition. This causes switch S7 to reopen and switch S6 to reclose.

The amplifier A3 is thus only momentarily actuated independently of the switch SS, but the momentary actuation of the amplifier is sufficient to start another timing cycle of the Sequence Timer. The above-described process is now repeated and a second weld is produced. The operation thus continues as the work passes through the welding apparatus.

Eventually the work reaches a point at which the switch S2 engages only the flange 41 of the side wall 31 of the work, but this has no effect on the welding operation because switch S2 is closed by a single thickness of the material. This enables the apparatus to produce the last weld. After the last weld switch S2 may clear the work entirely and open. This prevents further actuation of the Sequence Timer and of amplifier A1 so that the electrodes E1 and E2 remain retracted from the work. But switch S3 remains closed and switch S4 being at this point closed, the operation of the work advancing means continues.

With switch S3 closed, FF1 and FF2 are in condition II. If S6 is closed and S7 open, FF3 is in condition I and amplifier A2 is actuated actuating solenoid RR to index the work one notch at the end of the indexing operation S7 closes and S6 opens reverting FF3 to condition I and actuating A2 to permit solenoid RR to reset S6 then recloses and S7 reopens repeating the above operation. This continues until switch S3 drops from the top 35 to the flange 41 on the side wall 31. At this point, switch S3 is opened. The actuation of the advancing mechanism before the opening of switch S3 is sufficient to eject the work.

The opening of switch S3 permits flip-flop FF1 to pass from condition II to condition I, and since switch SS is also open, the transition takes place. On the closing of contact K1, the input of amplifier A1 can now only be grounded to the emitter 53 of transistor T2. Amplifier A1 then remains in its stand-by condition and relay RV remains unactuated so that the electrodes remain disengaged from the work.

In addition, the flopping of flip-flop FF1 from condition II to condition I, conditions flip-flop FF2 to pass from condition II to condition I. Since at this time the electrodes E1 and E2 are disengaged from the work, switch S5 is open and flip-flop FF2 passes from condition II to condition I. Further, the passing of flip-flop FF1 from condition II to condition I grounds junctions J2 and J3, and the further actuation of amplifier A2 is prevented. The pawl 43 of the work advancing mechanism now remains in its retracted position, and switch S6 is closed and S7 open so that flip-flop FF3 is in its condition I. The apparatus is now set for a new operation.

In certain situations it is desirable that the work be indexed by hand. This operation can be carried out independently of switches S3 and S2 so that if desired work may be indexed into the machine. It may also be carried out with the Sequence Timer set for non-repeat so that a series of welds spaced as desired may be made. In either event the indexing is started by closing switch SM.

This operation causes junction J5 to become highly negative (through resistor 291). The flow of current from conductor L1 through switch S4, rectifier R15 to junction J5 causes the base 275 of transistor T9 to become negative and transistor T9 conducts. This causes the base 275 of transistor T10 to become positive relative to its emitter electrode 273, and transistor T10 becomes non-conducting. The base 285 of transistor T14 then becomes negative and the latter conducts actuating relay RR. The actuation of relay RR actuates the work advancing mechanism to advance the work. In addition, the operation of the pawl 43 causes switch S6 to open to condition flip-flop FF3 to change from condition I to condition II and thus causes switch S7 to close to cause the flip-flop FF3 to change. This results in effect in the grounding of junction J5, so that the base 275 of transistor T9 becomes substantially positive. Transistors T9 and T14 then become non-conducting, while transistor T10 becomes conducting and the pawl 43 is reset in the initial condition. With the pawl 43 in the initial condition and the switch SM still closed, the above-described process is repeated.

*Conclusion*

The sequencing system here described is capable of producing a highly precise and reliable sequence operation with a minimum of relays and is of relatively simple structure.

Maloperation is prevented because so long as flip-flop FF1 or flip-flop FF2 is in condition I, or flip-flop FF3 is in condition II, junction J3 is grounded and actuation of the work advancing mechanism is prevented. This, in turn, maintains switch S7 open and switch S6 closed, and actuation of amplifier A3 is prevented, so that the flow of welding current is positively prevented. Thus, all of the functions of the welding apparatus are coordinated.

While a specific embodiment of this invention has been disclosed above, many modifications thereof are feasible. The invention, therefore, is not to be limited except insofar as is necessitated by the spirit of the prior art.

We claim as our invention:

1. Apparatus for controlling the operation of a welding system in the joining of work with a series of welds as said work is advanced through said system, said system including a welding head having a retracted position and a work engaging position, means for actuating said head from said retracted position to said engaging position, work advancing means, means for actuating said work advancing means, a welding sequence timer including first normally open switch means, means for actuating said timer, second normally open switch means adapted to be closed by the positioning of the work in said system, third normally open switch means adapted to be closed by the positioning of the work in said system, said second and third means being positioned in opposite sides of said head in the direction of advancement of said work, with said second means engaging said work first, fourth switch means responsive to said head and closed in the retracted position of said head, fifth switch means responsive to said head and closed in the work engaging position of said head, sixth switch means responsive to said work advancing means and closed with said advancing means in condition to advance work, and seventh switch means responsive to said work advancing means and closed with said advancing means in a condition just after it has advanced, said apparatus including a first flip-flop network, a second flip-flop network, a third flip-flop network, each said network having a first condition and a second condition, means locking said first network in said first condition, means responsive to said first network while it is in the first condition for locking said second network in its first condition, means responsive to said sixth switch means so long as it is closed for locking said third network in its first condition, an energizing circuit for said work actuating means, means including said first switch means for connecting said circuit to said first network to condition said circuit to be energized, said circuit energizing said work actuating means while so connected when said network is in said second condition, means responsive to the closing of said third switch means for permitting said first network to pass from said first condition to said second condition, monetary actuable manual means for causing said first network, while so permitted, to pass from said first to said second condition, means responsive to the closing of said fifth switch means for causing said second network to pass from said first condition to said second condition, an energizing circuit for said timer actuating means, means responsive to the closing of said third switch means for connecting said timer energizing circuit to said manual means to condition said timer energizing circuit to be energized on the actuation of said manual means, means responsive to the closing of said third switch means for connecting said timer energizing circuit to said first and second networks to condition said timer energizing circuit to be energized only on the passing of both said networks from their respective first to their respective second conditions, an energizing circuit for said work advancing means, means including said fourth switch means connecting said advancing means energizing circuit to said first, said second, and said third networks to condition said circuit to be energized only when said first and second networks are in their respective second conditions and said first network is in its first condition, means responsive to the closing of said fifth switch means for causing said second network to pass from its first condition to its second condition, and means responsive to the closing of said seventh switch means for causing said third network to pass from its first condition to its second condition.

2. In combination, a first transistor, a second transistor, a third transistor, a fourth transistor, each of said transistors having an emitter electrode, a collector electrode, and a base electrode, means connecting said electrodes of said first and second transistors in a first flip-flop network including a regenerative feedback connection, means connected to said emitters and bases of said first and second transistors effective in the stand-by condition of the combination for impressing potentials between said last-named emitters and bases, respectively, such that the potential of the emitter to the base of the first transistor is of opposite polarity to the potential of the emitter to the base of the second transistor, said network having parameters such that in said stand-by condition said second transistor is conducting and said first transistor is non-conducting, means connecting said electrodes of said third and fourth transistors in a second flip-flop network including a regenerative feedback connection, means connected to the emitters and bases of said third and fourth transistors effective during the stand-by condition of the combination for impressing potentials between the emitters and bases, respectively, of said last-named transistors such that the potential of the emitter to the base of said third transistor is of opposite polarity to the potential beween the emitter and base of said fourth transistor, said second network having parameters such that in said stand-by condition said fourth transistor is conducting and said third transistor is non-conducting, and means connecting the collector of the first transistor to the base of the fourth transistor to maintain said potential of the emitter to the base of the fourth transistor at the above said polarity and thus to lock the second network in its first condition so long as said first network is in its first condition.

3. In combination a first transistor, a second transistor, a third transistor, a fourth transistor, each transistor having an emitter electrode, a collector electrode, and a base electrode, means connecting said electrodes of said first and second transistors in a first flip-flop network including a regenerative feedback connection, means connected to said emitters and bases of said first and second transistors effective during the stand-by condition of the combination, for impressing potentials between said last-named emitters and bases, respectively, such that the potential of the emitter to the base of the first transistor is of opposite polarity to the potential of the emitter to the base of the second transistor, said first network having parameters such that in said stand-by condition said second transistor is conducting and said first transistor non-conducting, means connecting said electrodes of said third and fourth transistors in a second flip-flop network including a regenerative feedback connection, means connected to said emitters and bases of said third and fourth transistors, effective during the stand-by condition of the combination, for impressing potentials between said last-named emitters and bases such that the potential of the emitter to the base of the third transistor is of opposite polarity to the potential of the emitter to the base of the fourth transistor, said second network having parameters such that in said stand-by condition said fourth transistor is conducting and said third transistor non-conducting, a first rectifier, a second rectifier, means connecting said rectifiers to a common junction both poled so as to conduct positive current to said junction, means connecting said first rectifier to said collector of said second transistor, and means connecting said second rectifier to said collector of said fourth transistor.

4. In combination, a first transistor, a second transistor, each transistor having an emitter electrode, a collector electrode, and a base electrode and being of the PNP type, means connecting the emitter electrodes to ground, means including first and second resistance means for impressing first and second potentials negative with respect to ground on each collector electrode, means connected to the base of each electrode for varying the conductivity between each emitter electrode and each collector electrode, a first rectifier, a second rectifier, each said rectifier having an anode and a cathode, means connecting said cathodes to a common junction, means connecting the anode of the first rectifier to the collector of the first transistor, means connecting the anode of the second rectifier to the collector of the second transistor, means including third resistance means for connecting a third potential negative with respect to ground on said junction, said resistance means being so related that when either of said transistors is conducting said junction is substantially at ground potential and when both of said transistors are non-conducting said junction is at a substantial negative potential.

5. In combination, a first transistor, a second transistor, each transistor having an emitter electrode, a collector electrode, and a base electrode and being of the PNP type, means connecting the emitter electrodes to ground, means including first and second resistance means for impressing first and second potentials negative with respect to ground on each collector electrode, means connected to the base of each electrode for varying the conductivity between each emitter electrode and each collector electrode, a first rectifier, a second rectifier, a third rectifier, each said rectifier having an anode and a cathode, means connecting said cathodes to a common junction, means connecting the anode of the first rectifier to the collector of the first transistor, means connecting the anode of the second rectifier to the collector of the second transistor, means including third resistance means for connecting a third potential negative with respect to ground to said junction, and means including fourth resistance means for connecting a fourth potential positive with respect to ground to said anode of said third rectifier, said resistance means being so related that when either of said transistors is conducting the current through said third resistance means and said third rectifier is low and when both said transistors are conducting said current is substantially higher.

6. In combination, a first transistor, a second transistor, each transistor having an emitter electrode, a collector electrode, and a base electrode and being of the same type, means connecting the emitter electrodes to ground, means including first and second resistance means for impressing first and second potentials having a polarity with respect to ground corresponding to said type on each collector electrode, means connected to the base of each electrode for varying the conductivity between each emitter electrode and each collector electrode, a first rectifier, a second rectifier, each said rectifier having a first electrode and a second electrode such that a potential of said polarity with respect to ground impressed on said second electrode and said first electrode grounded would cause positive current to flow from said first electrode to said second electrode, means connecting said second electrodes to a common junction, means connecting the first electrode of the first rectifier to the collector of the first transistor, means connecting the first electrode of the second rectifier to the collector of the second transistor, means including third resistance means for connecting a third potential having said polarity with respect to ground on said junction, said resistance means being so related that when either of said transistors is conducting said junction is substantially at ground potential and when both of said transistors are non-conducting said junction is at a substantial potential having said polarity with respect to ground.

7. In combination, a first transistor, a second transistor, each transistor having an emitter electrode, a collector electrode, and a base electrode and being of the same type, means connecting the emitter electrodes to ground, means including first and second resistance means for impressing first and second potentials having a predetermined polarity with respect to ground corresponding to said type on each collector electrode, means connected to the base of each electrode for varying the conductivity between each emitter electrode and each collector electrode, a first rectifier, a second rectifier, a third rectifier, each said rectifier having a first electrode and a second electrode such that a potential of said polarity with respect to ground impressed on said second electrode and said first electrode grounded would cause positive current to flow from said first electrode to said second electrode, means connecting said second electrodes to a common junction, means connecting the first electrode of the first rectifier to the collector of the first transistor, means connecting the first electrode of the second rectifier to the collector of the second transistor, means including third resistance means for connecting a third potential having said polarity with respect to ground to said junction, and means including fourth resistance means for connecting a fourth potential having a polarity opposite to said polarity with respect to ground to said first electrode of said third rectifier, said resistance means being so related that when either of said transistors is conducting the current through said third resistance means and said third rectifier is low and when both said transistors are conducting said current is substantially higher.

8. In apparatus for controlling the operation of a welding system in the joining of work with a series of welds as said work is advanced through said system, said system including a welding head having a retracted position and work engaging position, means connected to said head for actuating said head from said retracted position to said work engaging position, and switch means connected to said actuating means and having a first position and a second position, said switch means being responsive to said actuating means so that it is in said first position when said head is in said retracted position and it is in said second position when said head is in said work engaging position, said system also including momentarily actuable means for starting a welding operation to produce one of said series of welds, a flip-flop network having a first condition and a second condition, means connected to said network and to said switch means to maintain said network in said first condition when said switch means is in said first position and to revert said network to said second condition when said switch means is in said second position, means connected to said switch means and to said starting means for preventing operation of said starting means when said switch means is in said first position and for permitting operation of said starting means when said switch means is in said second position, and means connected to said flip-flop and to said actuating means for permitting said actuating means to actuate said head to a work engaging position only when said flip-flop is in said first condition and for causing said actuating means to retract said head when said flip-flop is in said second condition.

References Cited in the file of this patent

UNITED STATES PATENTS

| | | |
|---|---|---|
| 2,580,374 | Carpenter | Dec. 25, 1951 |
| 2,622,212 | Anderson | Dec. 16, 1952 |
| 2,651,728 | Wood | Sept. 8, 1953 |